United States Patent
Oguro et al.

(10) Patent No.: US 11,565,700 B2
(45) Date of Patent: Jan. 31, 2023

(54) VEHICLE CONTROL DEVICE AND VEHICLE CONTROL METHOD

(71) Applicant: HONDA MOTOR CO., LTD., Tokyo (JP)

(72) Inventors: Chihiro Oguro, Wako (JP); Nozomu Hirosawa, Wako (JP); Daichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/189,954

(22) Filed: Mar. 2, 2021

(65) Prior Publication Data
US 2021/0276558 A1 Sep. 9, 2021

(30) Foreign Application Priority Data
Mar. 4, 2020 (JP) .............................. JP2020-036596

(51) Int. Cl.
*B60W 30/18* (2012.01)
*B60W 50/10* (2012.01)
*G06V 20/56* (2022.01)

(52) U.S. Cl.
CPC ...... *B60W 30/18163* (2013.01); *B60W 50/10* (2013.01); *G06V 20/588* (2022.01); *B60W 2554/4041* (2020.02); *B60W 2554/4049* (2020.02)

(58) Field of Classification Search
CPC ........... B60W 30/18163; B60W 50/10; B60W 2554/4041; B60W 2554/4049; B62D 15/0255; G06K 9/00798
See application file for complete search history.

(56) References Cited

U.S. PATENT DOCUMENTS

| | | | |
|---|---|---|---|
| 10,131,306 B2 | 11/2018 | Takae et al. | |
| 10,131,356 B2 | 11/2018 | Takae | |
| 10,183,668 B2 | 1/2019 | Takae | |
| 10,259,459 B2 | 4/2019 | Takae | |
| 2018/0086338 A1 | 3/2018 | Yamada et al. | |
| 2018/0222422 A1* | 8/2018 | Takae ................. | B60W 40/105 |

(Continued)

FOREIGN PATENT DOCUMENTS

| | | |
|---|---|---|
| CN | 107851388 A | 3/2018 |
| CN | 107851389 A | 3/2018 |

(Continued)

OTHER PUBLICATIONS

Office Action dated Jun. 1, 2021 issued over the corresponding Japanese Patent Application No. 2020-036596 with the English translation of the pertinent portion.

(Continued)

*Primary Examiner* — Kenneth J Malkowski
(74) *Attorney, Agent, or Firm* — Carrier Shende & Associates, P.C.; Joseph P. Carrier; Jeffrey T. Gedeon

(57) ABSTRACT

A lane change control unit restricts an automatic lane change in the case of predicting that a user's own vehicle after having made the automatic lane change will be adjacent to another vehicle that exists inside of a third lane or on a third lane dividing line, and executes the automatic lane change without restriction in the case of predicting that the user's own vehicle after having made the automatic lane change will be adjacent to another vehicle that exists inside a fourth lane or inside of a road shoulder.

8 Claims, 8 Drawing Sheets

(56) References Cited

U.S. PATENT DOCUMENTS

2018/0354519 A1* 12/2018 Miyata .................. B60W 10/20
2019/0061766 A1*  2/2019 Nishiguchi ..... B60W 30/18163
2019/0084572 A1*  3/2019 Oishi .................... B60W 10/00
2019/0176832 A1   6/2019 Nishiguchi et al.
2021/0171042 A1*  6/2021 Hayakawa ...... B60W 30/18163
2021/0237739 A1*  8/2021 Hayakawa ...... B60W 30/18163

FOREIGN PATENT DOCUMENTS

| CN | 107924622 A | 4/2018 |
| CN | 107924624 A | 4/2018 |
| JP | 2008-168827 A | 7/2008 |
| JP | 2017-073059 A | 4/2017 |
| JP | 2018-055154 A | 4/2018 |
| JP | 2019-043169 A | 3/2019 |
| JP | 2019-104430 A | 6/2019 |

OTHER PUBLICATIONS

Office Action including search report dated Jan. 25, 2022 issued over the corresponding Chinese Patent Application No. 202110239694.4 with the English translation thereof.

\* cited by examiner

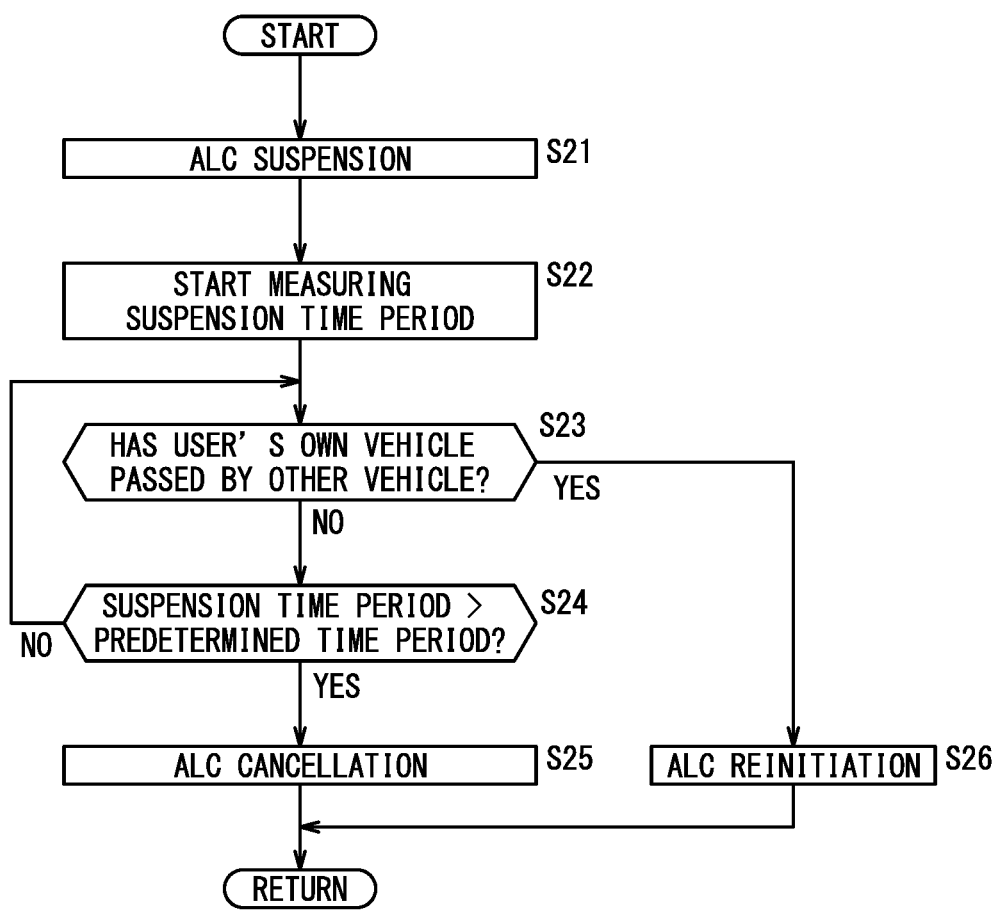

VEHICLE CONTROL DEVICE AND VEHICLE CONTROL METHOD

CROSS-REFERENCE TO RELATED APPLICATION

This application is based upon and claims the benefit of priority from Japanese Patent Application No. 2020-036596 filed on Mar. 4, 2020, the contents of which are incorporated herein by reference.

BACKGROUND OF THE INVENTION

Field of the Invention

The present invention relates to a vehicle control device and a vehicle control method configured to execute an automatic lane change.

Description of the Related Art

In recent years, there have been developed a driving assisted vehicle in which portions of a travel control of a user's own vehicle are executed regardless of the intention of the driver, and an automatically driven vehicle in which all of the travel control of the user's own vehicle are executed regardless of the intention of the driver. In Japanese Laid-Open Patent Publication No. 2019-043169, a vehicle control system is disclosed in which a lane change is executed regardless of the intention of the driver. Such an automated lane change is referred to as an automatic lane change.

This vehicle control system, prior to execution of the automatic lane change from the first lane to the second lane on a road on which a first lane, a second lane, and a third lane are adjacent to each other, derives the control content for the lane change, and predicts an execution result of the control content. Furthermore, in the predicted execution result, the vehicle control system determines whether or not the user's own vehicle after having made the lane change and another vehicle traveling in the third lane are in a parallel traveling state. In the case that the vehicle control system makes a prediction to the effect that the user's own vehicle and the other vehicle will not be placed in a parallel traveling state, the automatic lane change is executed based on the derived control content. On the other hand, in the case that the vehicle control system makes a prediction to the effect that the user's own vehicle and the other vehicle will be placed in a parallel traveling state, the derived control content is changed.

SUMMARY OF THE INVENTION

A case may be considered in which the user's own vehicle is preparing to make a lane change from the third lane to the second lane or the first lane, at a timing at which the user's own vehicle executes a lane change from the first lane to the second lane. In this case, immediately after the user's own vehicle has made the lane change from the first lane to the second lane, a case may be considered in which another vehicle makes a lane change from the third lane to the second lane and approaches toward the user's own vehicle, and in the worst case, there is a concern that the vehicles may come into contact.

The present invention has been devised taking into consideration the aforementioned problem, and has the object of providing a vehicle control device and a vehicle control method, which are capable of reducing a risk of contact between the user's own vehicle and another vehicle immediately after execution of an automatic lane change.

One aspect of the present invention is characterized by a vehicle control device, comprising:

an external environment recognition unit configured to recognize a situation of a surrounding periphery of a user's own vehicle; and a lane change control unit configured to execute an automatic lane change by controlling a travel speed and steering of the user's own vehicle, based on a recognition result of the external environment recognition unit;

wherein, on a road on which a first lane, a first lane dividing line, a second lane, a second lane dividing line, a third lane, a third lane dividing line, and a fourth lane or a road shoulder are adjacent to each other, the lane change control unit executes the automatic lane change from the first lane to the second lane; and the lane change control unit restricts the automatic lane change in a case of predicting that the user's own vehicle after having made the automatic lane change will be adjacent to another vehicle that exists inside of the third lane or on the third lane dividing line, and executes the automatic lane change without restriction in a case of predicting that the user's own vehicle after having made the automatic lane change will be adjacent to the another vehicle that exists inside of the fourth lane or inside of the road shoulder.

Another aspect of the present invention is characterized by a vehicle control method, comprising:

an external environment recognition step of recognizing a situation of a surrounding periphery of a user's own vehicle; and a lane change control step of executing an automatic lane change by controlling a travel speed and steering of the user's own vehicle, based on a recognition result of the external environment recognition step;

wherein, in the lane change control step, on a road on which a first lane, a first lane dividing line, a second lane, a second lane dividing line, a third lane, a third lane dividing line, and a fourth lane or a road shoulder are adjacent to each other, the automatic lane change is executed from the first lane to the second lane; and in the lane change control step, the automatic lane change is restricted in a case of predicting that the user's own vehicle after having made the automatic lane change will be adjacent to another vehicle that exists inside of the third lane or on the third lane dividing line, and the automatic lane change is executed without restriction in a case of predicting that the user's own vehicle after having made the automatic lane change will be adjacent to the another vehicle that exists inside of the fourth lane or inside of the road shoulder.

According to the present invention, it is possible to reduce the risk of the user's own vehicle and another vehicle coming into contact with each other.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 8 is a flowchart of a second process.

DETAILED DESCRIPTION OF THE PREFERRED EMBODIMENTS

Preferred embodiments of a driving control device and a driving control method according to the present invention will be presented and described in detail below with reference to the accompanying drawings.

1. Configuration of Vehicle Control Device 10

Figure 1:
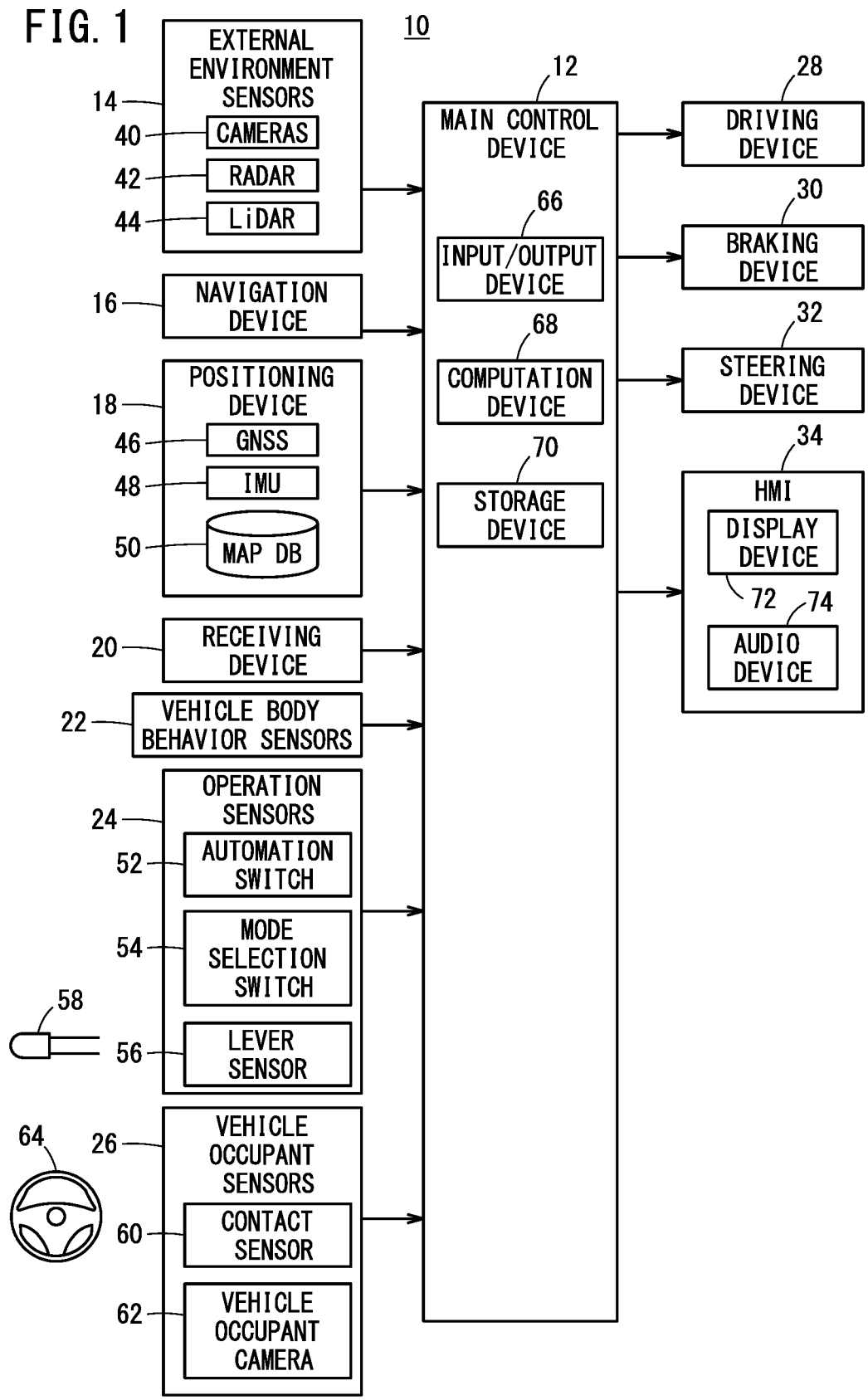
FIG. 1 is a block diagram of a vehicle control device.

A vehicle control device 10 will now be described with reference to FIG. 1. The vehicle control device 10 is provided in a user's own vehicle 120 (see FIG. 3). The vehicle control device 10 includes a so-called driving assist function that controls the travel speed and steering of the user's own vehicle 120 regardless of the intention of the diver.

The vehicle control device 10 includes a main control device 12, an input device group that inputs various information with respect to the main control device 12, and an output device group that operates the user's own vehicle 120 based on various information output by the main control device 12. Within the input device group, there are included external environment sensors 14, a navigation device 16, a positioning device 18, a receiving device 20, vehicle body behavior sensors 22, operation sensors 24, and vehicle occupant sensors 26. Within the output device group, there are included a driving device 28, a braking device 30, a steering device 32, and an HMI (Human Machine Interface) 34.

[1.1. Configuration of Input Device Group]

The external environment sensors 14 include a plurality of cameras 40, a plurality of radar devices 42, and a plurality of LiDAR devices 44. The cameras 40 capture images of the surrounding environment of the user's own vehicle 120, and output image information to the main control device 12. The radar devices 42 and the LiDAR devices 44 detect targets around the periphery of the user's own vehicle 120, and output detected information to the main control device 12.

The navigation device 16 measures the position of the user's own vehicle 120 using GPS, and generates a planned travel route from the position of the user's own vehicle 120 to a destination designated by the driver. The navigation device 16 outputs route information indicating the planned travel route that was generated to the main control device 12.

The positioning device 18 includes a GNSS (Global Navigation Satellite System) 46, an IMU (Inertial Measurement Unit) 48, and a map DB (map database) 50. The positioning device 18 measures the position of the user's own vehicle 120 using the GNSS 46 and the IMU 48, and outputs user's own vehicle position information indicating the position of the user's own vehicle 120 to the main control device 12. Further, the positioning device 18 outputs the map information that is stored in the map DB 50 to the main control device 12. Moreover, the map information stored in the map DB 50 is of higher accuracy than the map information stored in the navigation device 16, and includes various additional information (such as information in lane units, and the like).

The receiving device 20 includes first to third reception terminals (not shown). The first reception terminal receives wide area information broadcast by a broadcasting station. The second reception terminal receives local information transmitted by roadside units installed alongside a road 130 (see FIG. 3). The third reception terminal receives other vehicle information transmitted by other vehicles 122 (see FIG. 3). The first to third reception terminals output various types of received information to the main control device 12.

The vehicle body behavior sensors 22 include respective sensors for measuring behaviors (travel speed, acceleration/deceleration, yaw rate, etc.) of the user's own vehicle 120. The respective sensors output various types of detected information to the main control device 12.

The operation sensors 24 include an automation switch 52, a mode selection switch 54, and a lever sensor 56. In accordance with a switching operation performed by the driver, the automation switch 52 outputs to the main control device 12 instruction information to instruct that automation or cancellation of automation of either the travel speed or steering be carried out. In accordance with a switching operation performed by the driver, the mode selection switch 54 outputs to the main control device 12 selection information indicating which one of a plurality of driving modes (see item [2] below) has been selected. The lever sensor 56 detects an operated position of a turn signal (blinker) lever 58, and outputs operated position information indicating the operated position of the turn signal lever 58 to the main control device 12. Further, the operation sensors 24 include various sensors that detect operated amounts of operating elements (an accelerator pedal, a brake pedal, and a steering wheel 64).

The vehicle occupant sensors 26 include a contact sensor 60, and a vehicle occupant camera 62. The contact sensor 60 is a capacitance sensor or a pressure sensor provided on the steering wheel 64. The contact sensor 60 detects a gripping state (contact state) of the driver with respect to the steering wheel 64, and outputs the detected information to the main control device 12. The vehicle occupant camera 62 captures images of the driver, and outputs image information to the main control device 12.

[1.2. Configuration of Main Control Device 12]

The main control device 12 is configured by an ECU. The main control device 12 includes an input/output device 66, a computation device 68, and a storage device 70. The input/output device 66 includes an A/D conversion circuit and a communication interface. The computation device 68 includes a processor such as a CPU. The computation device 68 realizes various functions by executing programs stored in the storage device 70. A description will be given in item [1.4] below concerning the various functions of the computation device 68. The storage device 70 includes a RAM, a ROM, and the like. The storage device 70 stores various programs, and numerical information such as threshold values and the like that are used in processes performed by the computation device 68.

[1.3. Configuration of Output Device Group]

The driving device 28 includes a driving force output ECU, and control targets (none of which are shown) of the driving force output ECU. The driving device 28 adjusts the driving force in accordance with instruction information (driving instructions) output by the main control device 12.

The braking device 30 includes a brake ECU, and control targets (none of which are shown) of the brake ECU. The braking device 30 adjusts the braking force in accordance with instruction information (braking instructions) output by the main control device 12.

The steering device 32 includes an EPS (Electric Power Steering) ECU, and control targets (none of which are shown) of the EPS ECU. The steering device 32 adjusts a steering amount in accordance with instruction information (steering instructions) output by the main control device 12.

The HMI 34 includes a display device 72 and an audio device 74. The display device 72 outputs images in accordance with instruction information (notification instructions) output by the main control device 12. The audio device 74 outputs audio by way of voice in accordance with instruction information (notification instructions) output by the main control device 12.

[1.4. Various Functions of the Computation Device 68]

Figure 2:
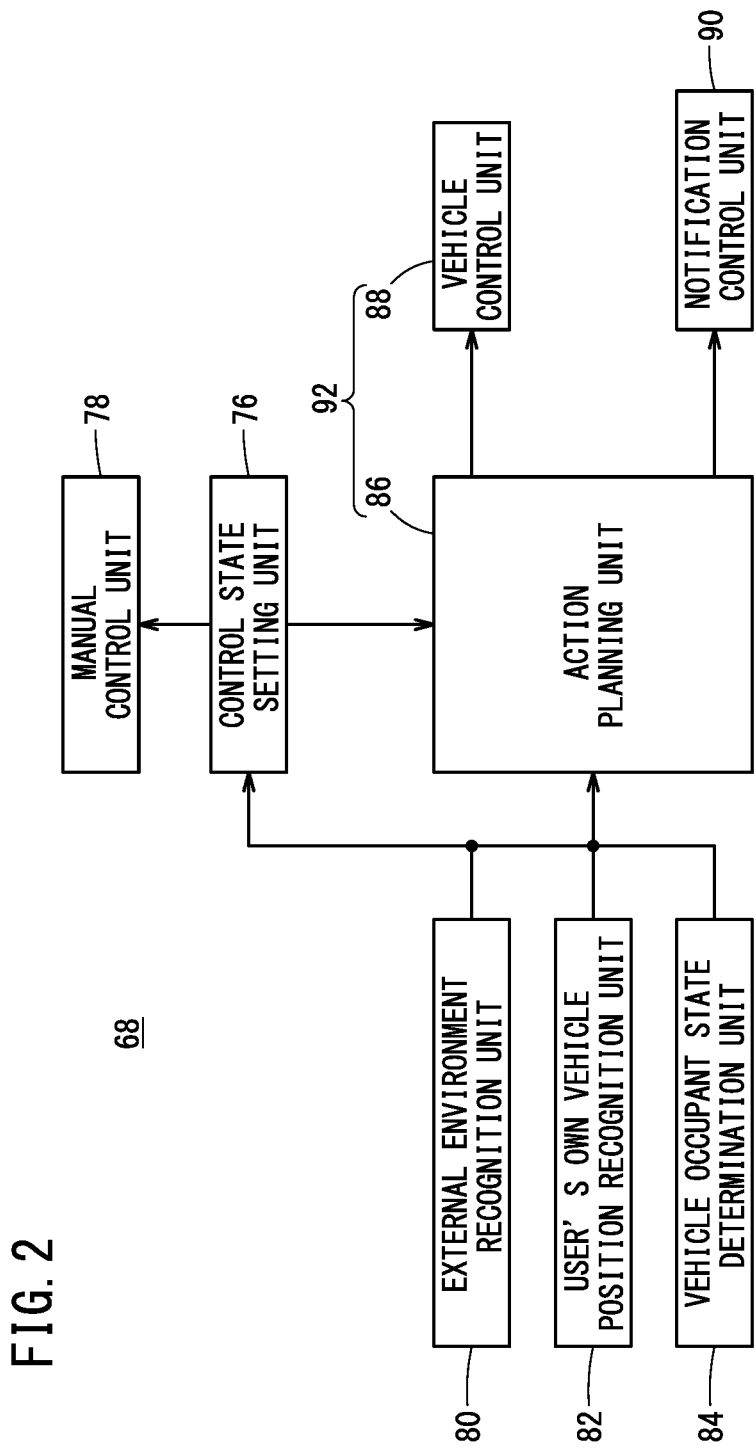
FIG. 2 is a functional block diagram of a computation device.

The various functions realized by the computation device 68 will be described with reference to FIG. 2. The computation device 68 functions as a control state setting unit 76, a manual control unit 78, an external environment recognition unit 80, a user's own vehicle position recognition unit 82, a vehicle occupant state determination unit 84, an action planning unit 86, a vehicle control unit 88, and a notification control unit 90. The action planning unit 86 and the vehicle control unit 88 are collectively referred to as a lane change control unit 92.

The control state setting unit 76 determines, in accordance with an operation performed using the automation switch 52, whether to execute various travel controls (control of the travel speed and control of steering) by either one of a manual control or an automatic control. Further, the control state setting unit 76 determines a degree of automation of the automatic control. For example, the control state setting unit 76 selects and sets, from among the plurality of driving modes, the degree of automation to be used when making the lane change. Concerning the automation of making the lane change which is executed in the present embodiment, a description thereof will be given in item [2] below.

The manual control unit 78 performs a travel control in relation to the manual control in accordance with the operated amounts of the operation elements (the accelerator pedal, the brake pedal, and the steering wheel 64) output by the operation sensors 24. The manual control unit 78 outputs instruction information (driving instructions, braking instructions, steering instructions) in relation to the manual control to the driving device 28, the braking device 30, and the steering device 32.

The external environment recognition unit 80 recognizes the situation occurring around the periphery of the user's own vehicle 120 on the basis of the image information and the detected information output by the external environment sensors 14. The user's own vehicle position recognition unit 82 recognizes the position of the user's own vehicle 120 on the basis of the map information and the user's own vehicle position information output by the positioning device 18. The vehicle occupant state determination unit 84 determines the gripping state of the driver (whether or not there is contact made) with respect to the steering wheel 64 on the basis of the detected information output by the contact sensor 60. Further, the vehicle occupant state determination unit 84 recognizes the surrounding monitoring state of the driver (whether or not the driver is looking forward, or whether or not the eyes are open) on the basis of the image information output by the vehicle occupant camera 62.

The action planning unit 86 creates an action plan in relation to the automatic control on the basis of the recognition result of the external environment recognition unit 80, and the recognition result of the user's own vehicle position recognition unit 82. For example, the action planning unit 86 generates a local map (dynamic map) which includes static information and dynamic information around the periphery of the user's own vehicle 120. In addition, the action planning unit 86 makes a judgment concerning optimal actions based on the local map and the state (travel speed, steering angle, travel position) of the user's own vehicle 120, and determines the travel speed and a travel trajectory in order to realize such actions.

The vehicle control unit 88 performs a travel control in relation to the automatic control in accordance with the action plan. For example, the vehicle control unit 88 calculates an acceleration or deceleration for enabling the user's own vehicle 120 to travel at the travel speed requested by the action planning unit 86. Further, the vehicle control unit 88 calculates a steering angle for enabling the user's own vehicle 120 to travel along the travel trajectory requested by the action planning unit 86. The vehicle control unit 88 outputs instruction information (driving instructions, braking instructions, steering instructions) in relation to the automatic control to the driving device 28, the braking device 30, and the steering device 32. In the case that a notification is generated in the action plan, the notification control unit 90 outputs instruction information (notification instruction) to the HMI 34.

2. Automatic Lane Change

The automatic control of the travel speed and steering in relation to making a lane change is referred to as an automatic lane change. The driving modes for the automatic lane change include a first mode to a third mode. The first mode is a driving mode in which the vehicle control device 10 starts to make the automatic lane change, in accordance with the intention of the driver (indicated by an operation of the turn signal lever 58 or the like). The second mode is a driving mode in which the vehicle control device 10 provides a proposal to make the automatic lane change to the driver regardless of the intention of the driver, and starts to make the automatic lane change in the case that the driver has approved of the proposal. The third mode is a driving mode in which the vehicle control device 10 starts to make the automatic lane change regardless of the intention or approval of the driver. The automatic lane change in the second and third modes is referred to as a first lane change, and the automatic lane change in the first mode is referred to as a second lane change. The degree of automation is higher in the second mode than in the first mode, and further, is higher in the third mode than in the second mode. Hereinafter, in order to facilitate explanation, the automatic lane change will be referred to as an ALC.

3. Outline of the Present Embodiment

An outline of the present embodiment will be described with reference to FIGS. 3 to 5. On the road 130 shown in FIGS. 3 to 5, a first lane 132, a second lane 134, a third lane 136, and a road shoulder 138 are aligned in rows alongside and adjacent to each other in that order from one side (the right side shown in FIG. 3, etc.) toward the other side (the left side shown in FIG. 3, etc.). A first lane dividing line 140 is disposed between the first lane 132 and the second lane 134. A second lane dividing line 142 is disposed between the second lane 134 and the third lane 136. A third lane dividing line 144 is disposed between the third lane 136 and the road shoulder 138. Moreover, another lane (a fourth lane) may be provided instead of the road shoulder 138. Further, there may be another lane or another road shoulder 138 provided more on the one side (the right side shown in FIG. 3, etc.) than the first lane 132. Further, in the case that a fourth lane is provided instead of the road shoulder 138, there may be another lane or another road shoulder 138 provided more on the other side (the left side shown in FIG. 3, etc.) than the fourth lane.

In the present embodiment, a situation is assumed in which the user's own vehicle 120 travels in the first lane 132, and furthermore executes the ALC from the first lane 132 to the second lane 134. Prior to initiation of the ALC, the action planning unit 86 predicts the execution result of the ALC. For example, the action planning unit 86 generates an ALC trajectory 150 as a travel trajectory of the ALC, and predicts an arrival position inside of the second lane 134. In FIGS. 3 to 5, a predicted position of the user's own vehicle 120 is indicated by the dashed lines. Furthermore, the action planning unit 86 predicts the time of completion (or a required time period) for the ALC, and predicts the position of the other vehicle 122 at the time of completion of the ALC. In FIGS. 3 to 5, a predicted position of the other vehicle 122 is indicated by the dashed lines. The predicted position of the other vehicle 122 is calculated based on, for example, information such as the most recent position, the travel direction, and the travel speed of the other vehicle 122. Moreover, in the case that the other vehicle 122 is stopped on the road shoulder 138, the action planning unit 86 sets the predicted position of the other vehicle 122 to the same position as prior to execution of the ALC.

Figure 3:
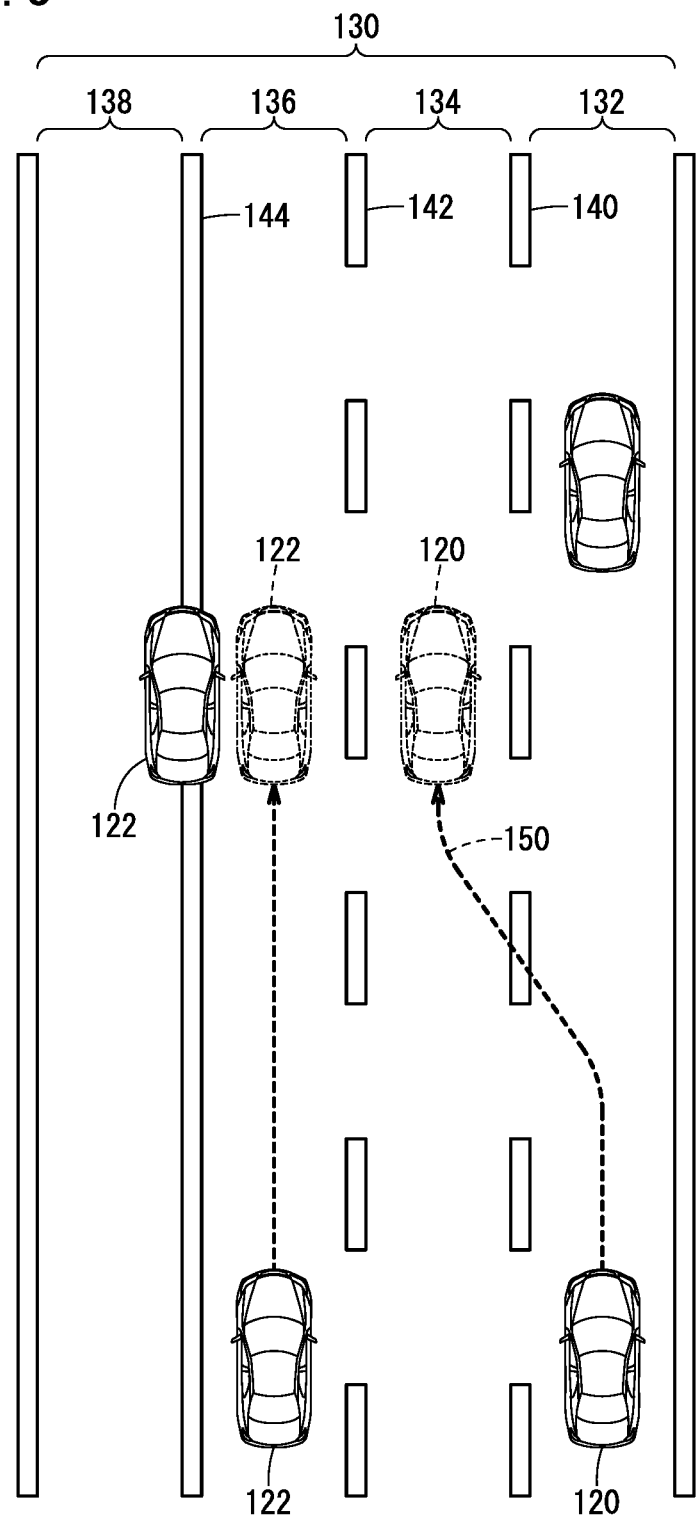
FIG. 3 is a diagram showing a situation in which an ALC (automatic lane change) is canceled.

In the case that the action planning unit 86 predicts the situation shown in FIG. 3, namely, a situation in which the user's own vehicle 120 after having executed the ALC is adjacent to another vehicle 122 existing inside of the third lane 136 or on the third lane dividing line 144, the vehicle control unit 88 restricts the ALC. The term "adjacent" as used herein implies that the user's own vehicle 120 and the other vehicle 122 are aligned in rows in a widthwise direction during a period from when the user's own vehicle 120 enters the second lane 134 and until the ALC comes to an end, and furthermore, that no other vehicle 122 exists between the two vehicles. A state in which the user's own vehicle 120 and the other vehicle 122 travel alongside one another is also included within the meaning of "adjacent". Further, restriction of the ALC implies cancellation of the ALC.

Figure 4:
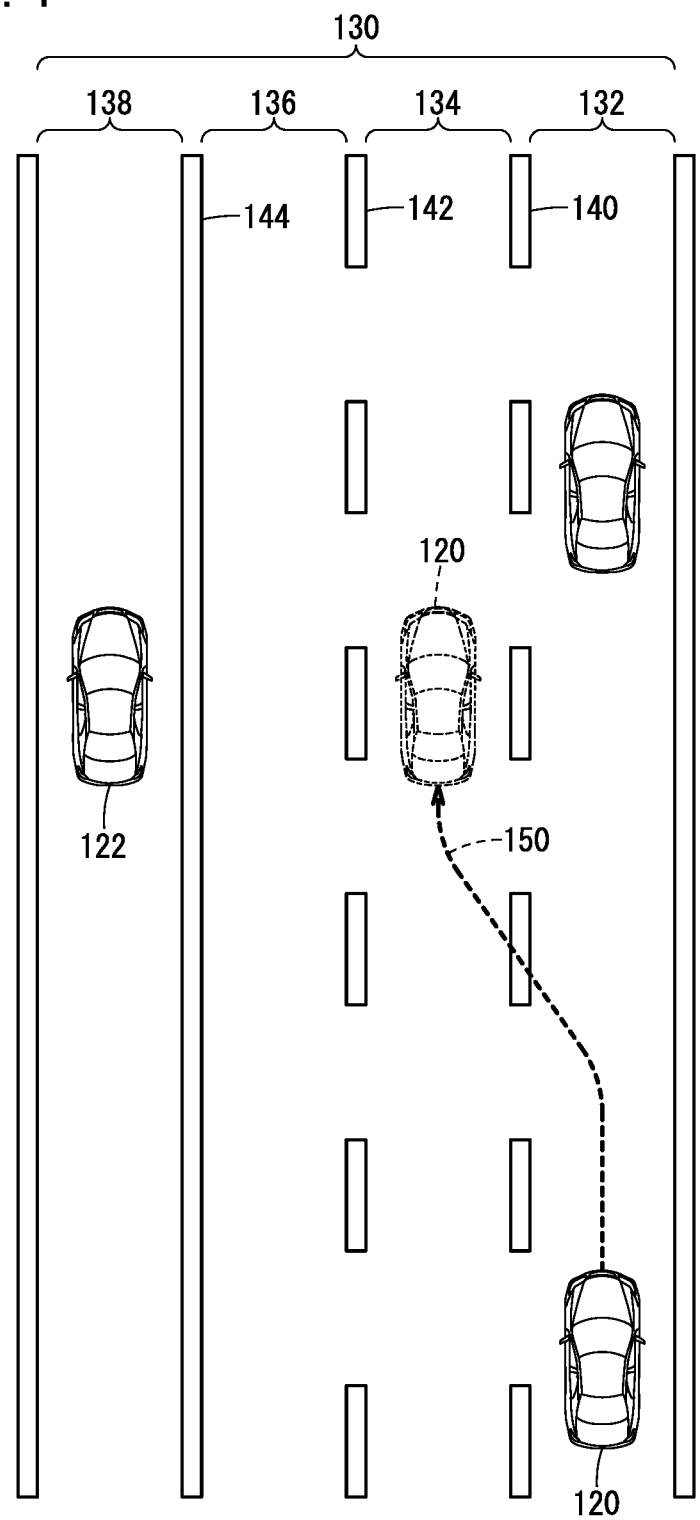
FIG. 4 is a diagram showing a situation in which the ALC is executed.
Figure 5:
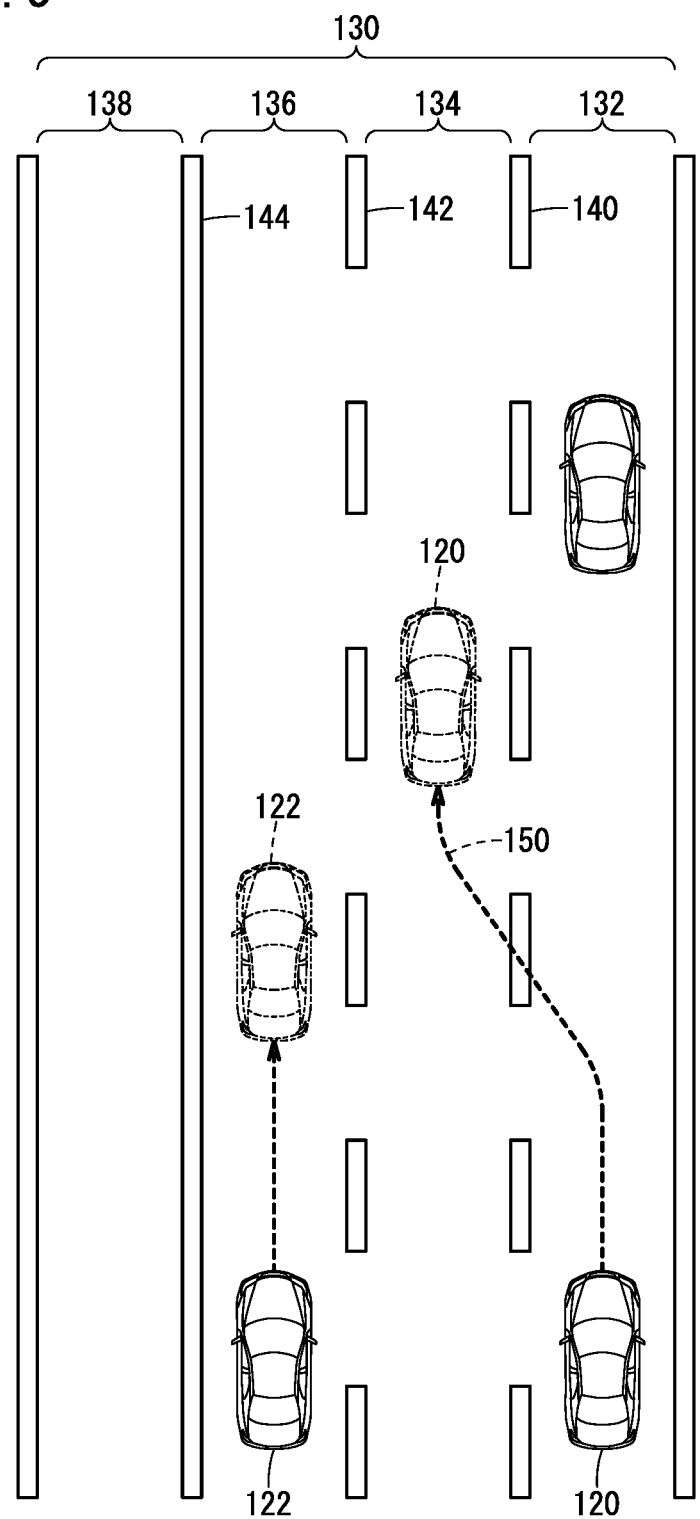
FIG. 5 is a diagram showing a situation in which the ALC is executed.

On the other hand, in the case that the action planning unit 86 predicts the situation shown in FIG. 4, namely, a situation in which the user's own vehicle 120 after having executed the ALC is adjacent to another vehicle 122 existing inside of the fourth lane or on the road shoulder 138, the vehicle control unit 88 executes the ALC without restriction. In this case, after having executed the ALC, a space for one lane is formed between the user's own vehicle 120 and the other vehicle 122. Further, in the case that the action planning unit 86 predicts the situation shown in FIG. 5 as well, namely, a situation in which the user's own vehicle 120 after having executed the ALC is not adjacent to another vehicle 122, the vehicle control unit 88 executes the ALC without restriction.

4. Process Performed by the Vehicle Control Device 10

[4.1. Main Process]

Figure 6:
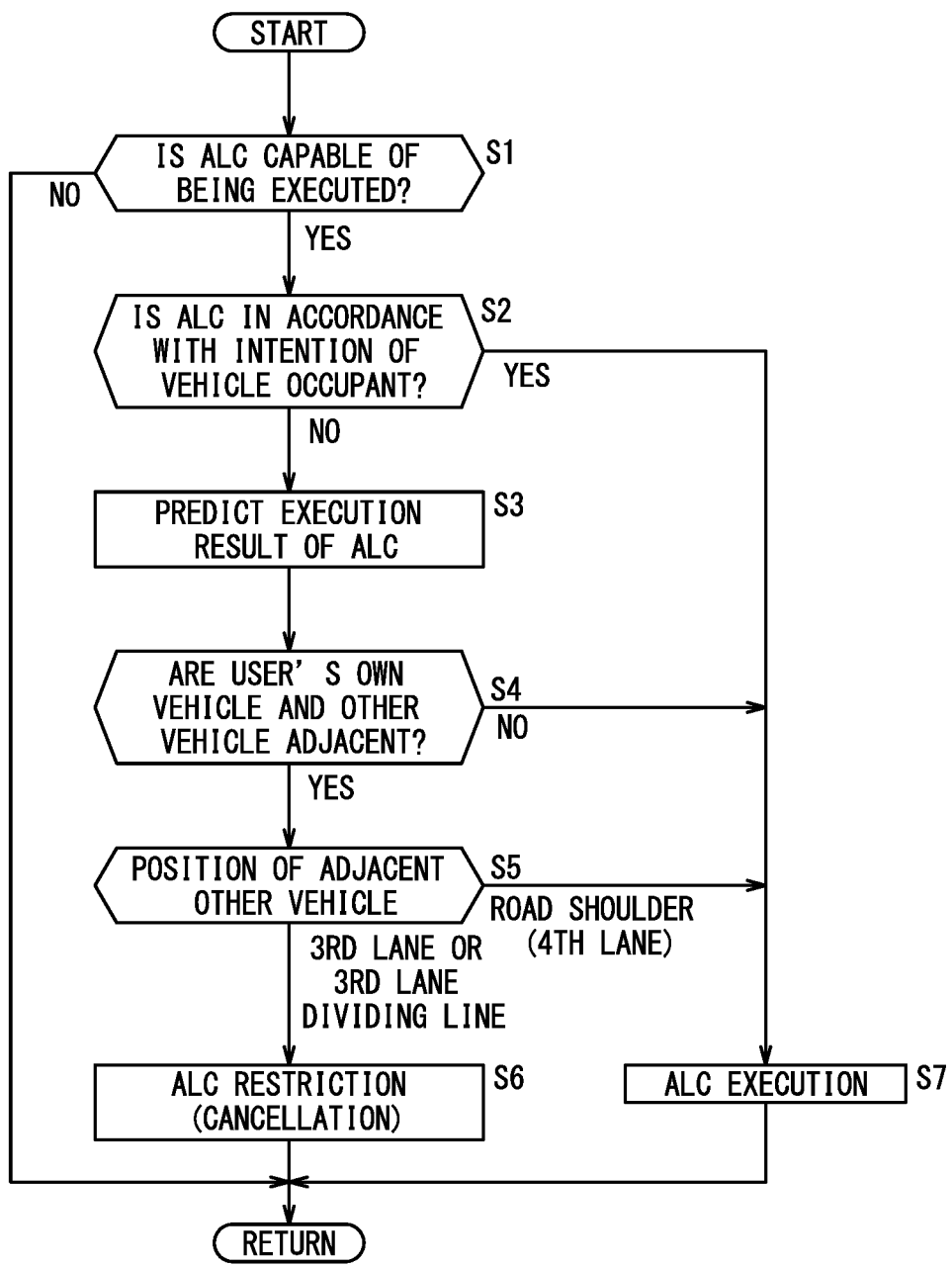
FIG. 6 is a flowchart of a main process.

A description will be given with reference to FIG. 6 of a main process performed by the vehicle control device 10. The main process shown in FIG. 6 is executed in predetermined time intervals, in a state in which at least a driving assist function in relation to making the ALC is operating. Moreover, the input device group (the external environment sensors 14, the navigation device 16, the positioning device 18, the receiving device 20, the vehicle body behavior sensors 22, the operation sensors 24, and the vehicle occupant sensors 26) acquires various information at an appropriate timing, and outputs the acquired information to the main control device 12.

In step S1, the action planning unit 86 determines whether or not the ALC is capable of being executed. For example, the action planning unit 86 makes a determination to the effect that the ALC can be executed, in the case it is judged that the ALC is necessary in order to reach the destination, and the environment is such that the ALC can be executed. The environment in which the ALC can be executed is, for example, a situation in which another vehicle 122 is not recognized to be present in the second lane 134. Further, in the case that the lever sensor 56 detects an operation of the turn signal lever 58 toward the side of the second lane 134, and in the case that the environment is such that the ALC can be executed, the action planning unit 86 makes a determination to the effect that the ALC is capable of being executed. In the case that the ALC is capable of being executed (step S1: YES), the process transitions to step S2. On the other hand, in the case that the ALC is not capable of being executed (step S1: NO), one cycle of the main process comes to an end.

In step S2, the action planning unit 86 determines whether or not the ALC is in accordance with the intention of the driver. In the case that the ALC is not in accordance with the intention of the driver (step S2: NO), or stated otherwise, if the ALC is to be executed regardless of the intention of the driver the process transitions to step S3. On the other hand, in the case that the ALC is in accordance with the intention of the driver (step S2: YES), the process transitions to step S7.

In step S3, the action planning unit 86 predicts the result of executing the ALC. As noted previously, on the basis of the recognition result of the external environment recognition unit 80 and various information detected by the vehicle body behavior sensors 22, the action planning unit 86 generates the ALC trajectory 150, and predicts the positions of the user's own vehicle 120 and the other vehicle 122 after execution of the ALC. When the process of step S3 is completed, the process transitions to step S4.

In step S4, the action planning unit 86 determines whether or not the user's own vehicle 120 and the other vehicle 122 are adjacent to each other in the generated ALC trajectory 150. In the case that the user's own vehicle 120 and the other vehicle 122 are adjacent to each other, and more specifically, when the situations shown in FIGS. 3 and 4 are predicted (step S4: YES), the process transitions to step S5. On the other hand, in the case that the user's own vehicle 120 and the other vehicle 122 are not adjacent to each other, and more specifically, when the situation shown in FIG. 5 is predicted (step S4: NO), the process transitions to step S7.

In step S5, the action planning unit 86 determines the position of the other vehicle 122 that is adjacent to the user's own vehicle 120 in the predicted execution result. In the case that the position of the other vehicle 122 is inside of the third lane 136 or on the third lane dividing line 144, and more specifically, in the case that the situation shown in FIG. 3 is predicted (step S5: third lane 136 or third lane dividing line 144), the process transitions to step S6. On the other hand, in the case that the position of the other vehicle 122 is inside of the road shoulder 138, and more specifically, when the situation shown in FIG. 4 is predicted (step S5: road shoulder 138), the process transitions to step S7. Moreover, on the road 130, a fourth lane may be provided instead of the road shoulder 138.

In step S6, the vehicle control unit 88 restricts the ALC, which in this instance, implies canceling the ALC. When the process of step S6 is completed, the one cycle of the main process comes to an end.

In step S7, the vehicle control unit 88 executes the ALC. At this time, the vehicle control unit 88 causes the user's own vehicle 120 to travel along the ALC trajectory 150. When the process of step S7 is completed, the one cycle of the main process comes to an end.

[4.2. First Process After Initiation of the ALC]

The relative positions of the user's own vehicle 120 and the other vehicle 122 after having made the ALC may change from the initial prediction, due to the fact that the behavior of the user's own vehicle 120 or the other vehicle 122 may undergo a change after having started the ALC. For this reason, the vehicle control device 10 performs the first process.

Figure 7:
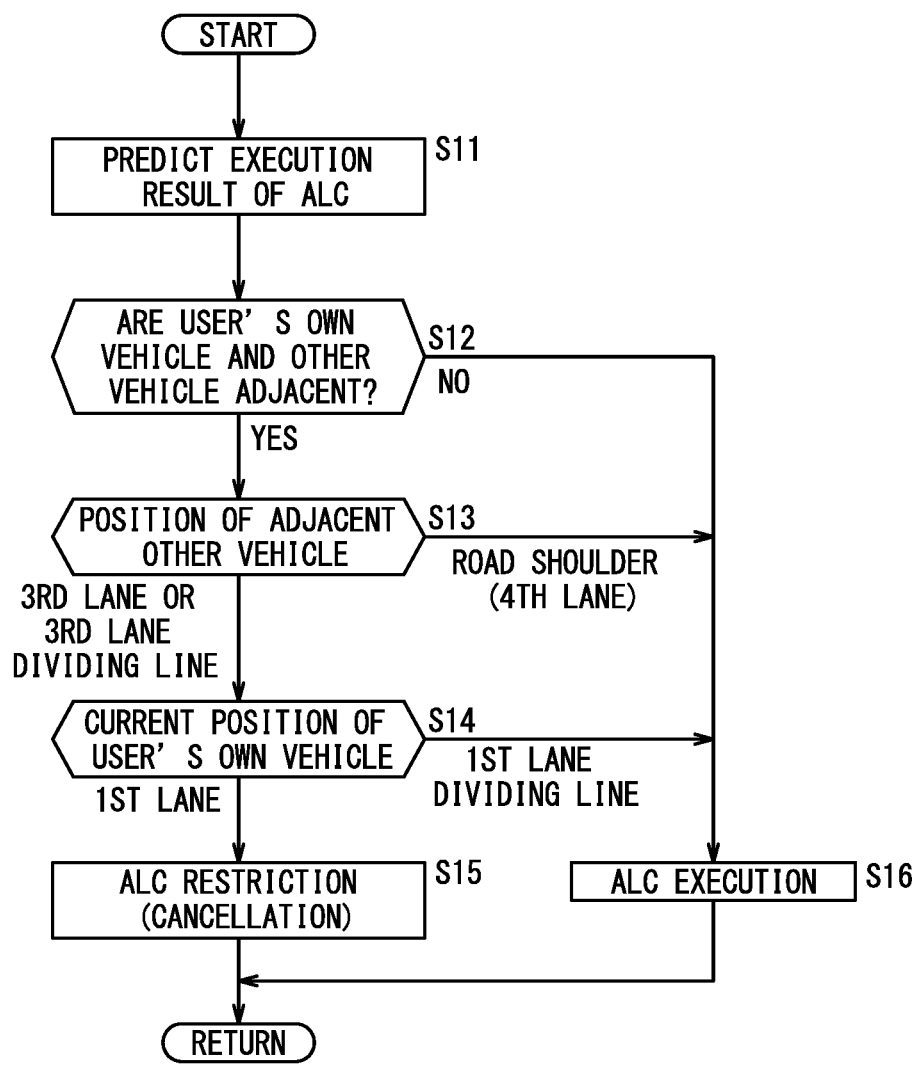
FIG. 7 is a flowchart of a first process.

With reference to FIG. 7, the first process performed by the vehicle control device 10 will be described. The main process shown in FIG. 7 is executed in each of predetermined time intervals, in the case that the ALC is initiated by the user's own vehicle 120.

The processes of steps S11 to S13 shown in FIG. 7 are the same as the processes of steps S3 to S5 shown in FIG. 6. Stated otherwise, in the first process, by using the most recent information in the same manner as in the main process, the action planning unit 86 determines the relative positions of the user's own vehicle 120 and the other vehicle 122 after having executed the ALC.

In step S14, the action planning unit 86 determines the current position of the user's own vehicle 120. At this time, based on the recognition result of the user's own vehicle position recognition unit 82 or the recognition result of the external environment recognition unit 80, the action planning unit 86 determines the current position of the user's own vehicle 120 in the widthwise direction of the road 130. For example, the action planning unit 86 determines whether or not any portion of the user's own vehicle 120 exists on the first lane dividing line 140. In the case that all portions of the user's own vehicle 120 exist inside of the first lane 132 (step S14: first lane 132), the process transitions to step S15. On the other hand, in the case that any portion of the user's own vehicle 120 exists on the first lane dividing line 140 (step S14: first lane dividing line 140), the process transitions to step S16. Moreover, also just before completion of the ALC, and more specifically, in the case that all portions of the user's own vehicle 120 exist inside of the second lane 134, the process transitions to step S16.

In step S15, the vehicle control unit 88 restricts the ALC, which in this instance, implies canceling the ALC. When the process of step S15 is completed, one cycle of the first process comes to an end.

In step S16, the vehicle control unit 88 executes (or continues) the ALC. When the process of step S16 is completed, the one cycle of the first process comes to an end.

[4.3. Second Process]

Instead of the process of step S15 of the first process, the vehicle control device 10 may perform a second process as shown in FIG. 8. In the second process, the vehicle control device 10 suspends the ALC until the user's own vehicle 120 passes by the other vehicle 122, and then reinitiates the ALC after the user's own vehicle 120 has passed by the other vehicle 122.

In step S21, the vehicle control unit 88 suspends the ALC. At this time, the user's own vehicle 120 is still traveling inside of the first lane 132. When the process of step S21 is completed, the process transitions to step S22.

In step S22, the action planning unit 86 starts measuring the ALC suspension time period using a real-time clock. When the process of step S22 is completed, the process transitions to step S23.

In step S23, based on the recognition result of the external environment recognition unit 80, the action planning unit 86 determines whether or not the user's own vehicle 120 has passed by the other vehicle 122. The other vehicle 122 referred to in this instance is the other vehicle 122 which was predicted by the action planning unit 86 to be adjacent to the user's own vehicle 120 after having executed the ALC. In the case that the user's own vehicle 120 has passed by the other vehicle 122 (step S23: YES), the process transitions to step S26. On the other hand, in the case that the user's own vehicle 120 has not passed by the other vehicle 122 (step S23: NO), the process transitions to step S24.

In step S24, the action planning unit 86 compares the suspension time period with a predetermined time period that is stored in the storage device 70. In the case that the suspension time period is less than or equal to the predetermined time period (step S24: NO), the process returns to step S23. On the other hand, in the case that the suspension time period has exceeded the predetermined time period (step S24: YES), the process transitions to step S25.

In step S25, the vehicle control unit 88 cancels the ALC. When the process of step S25 is completed, one cycle of the second process comes to an end.

In step S26, the vehicle control unit 88 reinitiates the ALC that was suspended. When the process of step S26 is completed, the one cycle of the second process comes to an end.

5. Modifications

In the above-described embodiment, the action planning unit 86 predicts a positional relationship between the user's own vehicle 120 and the other vehicle 122 after having executed the ALC based on the ALC trajectory 150. Instead of this feature, in the case that the external environment recognition unit 80 recognizes another vehicle 122 which is traveling in front of the user's own vehicle 120 and exists inside of the third lane 136 or on the third lane dividing line 144, the action planning unit 86 may make a determination to the effect that the other vehicle 122 is adjacent to the user's own vehicle 120.

In the first process or the second process, even if the action planning unit 86 recognizes that another vehicle 122, which is approaching from behind the user's own vehicle 120, is traveling in the third lane 136 after having executed the ALC, the action planning unit 86 may allow the ALC to continue without being canceled.

In the second process, the vehicle control device 10 suspends the ALC until the user's own vehicle 120 passes by the other vehicle 122, and then reinitiates the ALC after the user's own vehicle 120 has passed by the other vehicle 122. Instead of this feature, the vehicle control device 10 may cause the user's own vehicle 120 to decelerate, and thereby delay the timing at which the user's own vehicle 120 arrives at the second lane 134. In this case, the vehicle control device 10 may accelerate the user's own vehicle 120 after the other vehicle 122 has passed by the user's own vehicle 120.

6. Technical Concepts Obtained from the Embodiments

A description will be given below concerning technical concepts that can be grasped from the above-described embodiments and the modified examples.

The one aspect of the present invention is characterized by the vehicle control device 10, comprising:

the external environment recognition unit 80 that recognizes the situation of the surrounding periphery of the user's own vehicle 120; and the lane change control unit 92 that executes the automatic lane change by controlling the travel speed and the steering of the user's own vehicle 120, based on the recognition result of the external environment recognition unit 80;

wherein, on the road 130 on which the first lane 132, the first lane dividing line 140, the second lane 134, the second lane dividing line 142, the third lane 136, the third lane dividing line 144, and the fourth lane or the road shoulder 138 are adjacent to each other, the lane change control unit 92 executes the automatic lane change from the first lane 132 to the second lane 134; and the lane change control unit 92 restricts the automatic lane change in the case of predicting that the user's own vehicle 120 after having made the automatic lane change will be adjacent to the other vehicle 122 that exists inside of the third lane 136 or on the third lane dividing line 144, and executes the automatic lane change without restriction in the case of predicting that the user's own vehicle 120 after having made the automatic lane change will be adjacent to the other vehicle 122 that exists inside of the fourth lane or inside of the road shoulder 138.

In the above-described configuration, the lane change control unit 92 predicts the execution result of the automatic lane change from the first lane 132 to the second lane 134. In addition, the lane change control unit 92 restricts the automatic lane change in the case that, in the execution result, the other vehicle 122 adjacent to the user's own vehicle 120 exists inside of the third lane 136 or on the third lane dividing line 144. On the other hand, the lane change control unit 92 executes the automatic lane change without restriction in the case that the other vehicle 122 adjacent to the user's own vehicle 120 exists inside of the fourth lane or inside of the road shoulder 138.

Accordingly, in the case that the user's own vehicle 120 executes the automatic lane change from the first lane 132 to the second lane 134, a space for at least one lane is formed between the user's own vehicle 120 and the other vehicle 122. According to the above-described configuration, after the user's own vehicle 120 has executed the automatic lane change, there is a margin between the user's own vehicle 120 and the other vehicle 122 adjacent thereto, and therefore it is possible to reduce the risk of the user's own vehicle 120 and the other vehicle 122 coming into contact with each other.

In the one aspect of the present invention, the automatic lane change may include:

the first lane change (second and third modes) which is executed regardless of the intention of the driver; and the second lane change (first mode) which is executed in accordance with the intention of the driver, wherein, even in the case of predicting that the user's own vehicle 120 after having made the automatic lane change will be adjacent to the other vehicle 122 that exists inside of the third lane 136 or on the third lane dividing line 144, if the automatic lane change is the second lane change, the lane change control unit 92 may execute the second lane change.

In the above-described configuration, because the second lane change, which is executed in accordance with the intention of the driver, is executed, the lane change can be realized in accordance with the intention of the driver.

In the one aspect of the present invention, after having initiated the automatic lane change, in the case of predicting that the user's own vehicle 120 after having made the automatic lane change will be adjacent to the other vehicle 122 existing inside of the third lane 136 or on the third lane dividing line 144, the lane change control unit 92 may cancel the automatic lane change.

In accordance with the above-described configuration, even after having initiated the automatic lane change, it is possible to appropriately make a judgment concerning whether or not the automatic lane change can be executed.

In the one aspect of the present invention, in the case that the user's own vehicle 120 exists inside of the first lane 132 or on the first lane dividing line 140, the lane change control unit 92 may execute the automatic lane change without canceling the automatic lane change.

If the user's own vehicle 120 returns again to the first lane 132 after having entered the second lane 134, it is difficult for the driver of the other vehicle 122 that follows the user's own vehicle 120 to make a judgment concerning the behavior of the user's own vehicle 120. According to the above-described configuration, since the control for returning the user's own vehicle 120 to the first lane 132 is not executed, an adverse influence is not imparted to the driver of the other vehicle 122 that follows the user's own vehicle 120.

In the one aspect of the present invention, after having initiated the automatic lane change, in the case it is predicted that the user's own vehicle 120 after having made the automatic lane change will be adjacent to the other vehicle 122 existing inside of the third lane 136 or on the third lane dividing line 144, the lane change control unit 92 may suspend the automatic lane change, and in the case that the user's own vehicle 120 has passed by the other vehicle 122 during the suspension, the lane change control unit 92 may reinitiate the automatic lane change.

In accordance with the above-described configuration, the automatic lane change can be efficiently executed.

In the one aspect of the present invention, the lane change control unit 92 measures the suspension time period of the automatic lane change, and in the case that the suspension time period exceeds a predetermined time period, the lane change control unit 92 may cancel the automatic lane change.

In the one aspect of the present invention, after having initiated the automatic lane change, in the case it is predicted that the user's own vehicle 120 after having made the automatic lane change will be adjacent to the other vehicle 122 existing inside of the third lane 136 or on the third lane dividing line 144, the lane change control unit 92 may delay the timing at which the user's own vehicle 120 arrives at the second lane 134.

In the one aspect of the present invention, the lane change control unit 92 may decelerate the user's own vehicle 120, and thereby may delay the timing at which the user's own vehicle 120 arrives at the second lane 134.

The other aspect of the present invention is characterized by the vehicle control method, comprising:

the external environment recognition step of recognizing the situation of the surrounding periphery of the user's own vehicle 120; and the lane change control step of executing the automatic lane change by controlling the travel speed and the steering of the user's own vehicle 120, based on the recognition result of the external environment recognition step;

wherein, in the lane change control step, on the road 130 on which the first lane 132, the first lane dividing line 140, the second lane 134, the second lane dividing line 142, the third lane 136, the third lane dividing line 144, and the fourth lane or the road shoulder 138 are adjacent to each other, the automatic lane change is executed from the first lane 132 to the second lane 134; and in the lane change control step, the automatic lane change is restricted in the case of predicting that the user's own vehicle 120 after having made the automatic lane change will be adjacent to the other vehicle 122 that exists inside of the third lane 136 or on the third lane dividing line 144, and the automatic lane change is executed without restriction in the case of predicting that the user's own vehicle 120 after having made the automatic lane change will be adjacent to the other vehicle 122 that exists inside of the fourth lane or inside of the road shoulder 138.

The vehicle control device and the vehicle control method according to the present invention are not limited to the embodiments described above, and it is a matter of course that various modified or additional configurations could be adopted therein without deviating from the essence and gist of the present invention.

What is claimed is:

1. A vehicle control device, comprising:
   one or more processors that execute computer-executable instructions stored in a memory,
   wherein the one or more processors execute the computer-executable instructions to cause the vehicle control device to control a user's own vehicle to travel on a road,
   wherein on the road, a first lane, a first lane dividing line, a second lane, a second lane dividing line, a third lane, a third lane dividing line, and a fourth lane or a road shoulder are arranged adjacent to each other in this order,
   wherein the one or more processors cause the vehicle control device to:
      recognize a situation of a surrounding periphery of the user's own vehicle;
      determine whether an automatic lane change control operation of the user's own vehicle from the first lane to the second lane is executable, based on a recognition result;
      make a first prediction of where on the road a future position of the user's own vehicle and a future position of a surrounding vehicle would be subsequent to a completion of an execution of the automatic lane change control operation, in which the future position of the user's own vehicle is on the second lane and the future position of the surrounding vehicle is one of a third lane position and a fourth lane position, the third lane position being a position inside the third lane or on the third lane dividing line, and the fourth lane position being a position inside of the fourth lane or inside of the road shoulder;
      initiate execution of a control operation of the user's own vehicle to keep traveling on the first lane in response to the first prediction that indicates the future position of the user's own vehicle on the second lane and adjacent to the future position of the surrounding vehicle being the third lane position; and
      initiate the execution of the automatic lane change control operation in response to the first prediction that indicates the future position of the user's own vehicle on the second lane and the future position of the surrounding vehicle being the fourth lane position.

2. The vehicle control device according to claim 1, wherein the automatic lane change control operation is one of
   a first lane change control operation which is executed regardless of an intention of a driver; and
   a second lane change control operation which is executed in accordance with the intention of the driver, and
   in the second lane change control operation, the one or more processors cause the vehicle control device to override the execution of the control operation of the user's own vehicle to keep traveling on the first lane in response to the first prediction and initiate the execution of automatic lane change control operation.

3. The vehicle control device according to claim 1, wherein subsequent to initiating the execution of the automatic lane change control operation but prior to a completion of the automatic lane change control operation the one or more processors cause the vehicle control device to:
   make a second prediction of where on the road a new future position of the user's own vehicle and a new future position of the surrounding vehicle would be subsequent to initiating the execution of the automatic lane change control operation but prior to a completion of the automatic lane change control operation, in which the new future position of the user's own vehicle is on the second lane and in which the new future position of the surrounding vehicle is one of the third lane position and the fourth lane position,
   recognize, in response to the new future position of the user's own vehicle on the second lane and adjacent to the new future position of the surrounding vehicle being the third lane position, a current position of the user's own vehicle, in which the current position of the user's own vehicle is one of entirely inside the first lane and partially inside the first lane,
   stop the execution of the automatic lane change control operation and begin execution of the control operation of the user's own vehicle to keep traveling on the first lane based on a recognition result that the current position of the user's own vehicle is entirely inside of the first lane; and
   continue the execution of the automatic lane change control operation based on a recognition result that the current position of the user's own vehicle is partially inside the first lane.

4. The vehicle control device according to claim 1, wherein subsequent to initiating the execution of the automatic lane change control operation but prior to a completion of the automatic lane change control operation the one or more processors cause the vehicle control device to:
   make a second prediction of where on the road a new future position of the user's own vehicle and a new future position of the surrounding vehicle would be subsequent to initiating the execution of the automatic lane change control operation but prior to a completion of the automatic lane change control operation, in which the new future position of the user's own vehicle is on the second lane and in which the new future position of the surrounding vehicle is one of the third lane position and the fourth lane position,
   suspend the execution of the automatic lane change control operation, in response to the new future position of the user's own vehicle on the second lane and adjacent to the new future position of the surrounding vehicle being the third lane position, continuously detect a current position of the surrounding vehicle and a current position of the user's own vehicle until the current position of surrounding vehicle precedes the current position of the user's own vehicle in a traveling direction of the road, and restart execution of the automatic lane change control operation based on a recognition result that the current position of the surrounding vehicle precedes the current position of the user's own vehicle in a traveling direction of the road.

5. The vehicle control device according to claim 4, wherein the one or more processors cause the vehicle control device to measure a suspension time period which is an amount of time that the execution of the automatic lane change control operation is suspended, and control the user's own vehicle to return to a center of the first lane and begin execution of the control operation of the user's own vehicle to keep traveling on the first lane based on the suspension time period exceeding a predetermined time period.

6. The vehicle control device according to claim 1, wherein subsequent to initiating the execution of the automatic lane change control operation but prior to a completion of the automatic lane change control operation, the one or more processors cause the vehicle control device to:

make a second prediction of where on the road a new future position of the user's own vehicle and a new future position of the surrounding vehicle would be subsequent to initiating the execution of the automatic lane change control operation but prior to a completion of the automatic lane change control operation, in which the new future position of the user's own vehicle is on the second lane and in which the new future position of the surrounding vehicle is one of the third lane position and the fourth lane position, delay a timing at which the user's own vehicle arrives at the second lane, in response to the second prediction that indicates the new future position of the user's own vehicle on the second and adjacent to the new future position of the surrounding vehicle being the third lane position.

7. The vehicle control device according to claim 6, wherein the one or more processors cause the vehicle control device to decelerate the user's own vehicle to thereby delay the timing at which the user's own vehicle arrives at the second lane.

8. A vehicle control method for controlling a user's own vehicle to travel on a road, wherein on the road, a first lane, a first lane dividing line, a second lane, a second lane dividing line, a third lane, a third lane dividing line, and a fourth lane or a road shoulder are arranged adjacent to each other in this order, comprising:

recognizing a situation of a surrounding periphery of the user's own vehicle;

determining whether an automatic lane change control operation by controlling a travel speed and steering of the user's own vehicle from the first lane to the second lane is executable, based on a recognition result;

make a first prediction of where on the road a future position of the user's own vehicle and a future position of a surrounding vehicle would be subsequent to a completion of an execution of the automatic lane change control operation, in which the future position of the user's own vehicle is on the second lane and the future position of the surrounding vehicle is one of a third lane position and a fourth lane position, the third lane position being a position inside the third lane or on the third lane dividing line, and the fourth lane position being a position inside of the fourth lane or inside of the road shoulder;

initiate execution of a control operation of the user's own vehicle to keep traveling on the first lane in response to the first prediction that indicates the future position of the user's own vehicle on the second lane and adjacent to the future position of the surrounding vehicle being the third lane position; and initiating the execution of the automatic lane change control operation in response to the first prediction that indicates the future position of the user's own vehicle on the second lane and the future position of the surrounding vehicle being the fourth lane position.

\* \* \* \* \*